United States Patent [19]
Thomas et al.

[11] Patent Number: 6,135,224
[45] Date of Patent: Oct. 24, 2000

[54] VIBRATION ISOLATOR FOR MOTOR VEHICLE INTERMEDIATE STEERING SHAFT

[75] Inventors: Steven Mark Thomas; Allan K. Kennedy; Michael Francis Slasinski, all of Saginaw, Mich.

[73] Assignee: Delphi Technologies, Inc., Troy, Mich.

[21] Appl. No.: 09/305,967

[22] Filed: May 6, 1999

[51] Int. Cl.[7] .................................................. B60K 23/00
[52] U.S. Cl. ..................... 180/78; 267/141.1; 267/294; 464/91
[58] Field of Search ............................... 180/78; 280/777, 280/779; 74/492; 267/141.1, 294; 464/87, 89, 91

[56] References Cited

U.S. PATENT DOCUMENTS

| T100,801 | 7/1981 | Bianca | 267/141.1 |
| 2,075,567 | 3/1937 | Benedek | 280/89 |
| 2,231,037 | 2/1941 | Taylor | 267/280 |

*Primary Examiner*—Paul N. Dickson
*Assistant Examiner*—Faye M. Fleming
*Attorney, Agent, or Firm*—Edmund P. Anderson

[57] ABSTRACT

A linear vibration isolator between a pair of shaft segments of a motor vehicle intermediate steering shaft including an outer member rigidly connected to one of the shaft segments, an inner member rigidly connected to the other of the shaft segments and cooperating with the outer member in defining an annular chamber therebetween, and an axially flexible and torsionally stiff disc pack in the annular chamber. The disc pack includes a plurality of flat outer spacer rings, a plurality of flat inner spacer rings nested inside of the outer spacer rings, and a plurality of elastomeric isolator discs stacked between the nested pairs of inner and outer spacer rings. The outer spacer rings with the isolator discs therebetween are clamped against a shoulder on the outer member and coupled to the outer member for unitary rotation therewith. The inner spacer rings with the isolator discs therebetween are clamped against a shoulder on the inner member and coupled to the inner member for unitary rotation therewith. The effective axial flexibility and torsional stiffness of the disc pack is determined by the physical characteristics of and the number of isolator discs and inner and outer spacer rings.

8 Claims, 2 Drawing Sheets

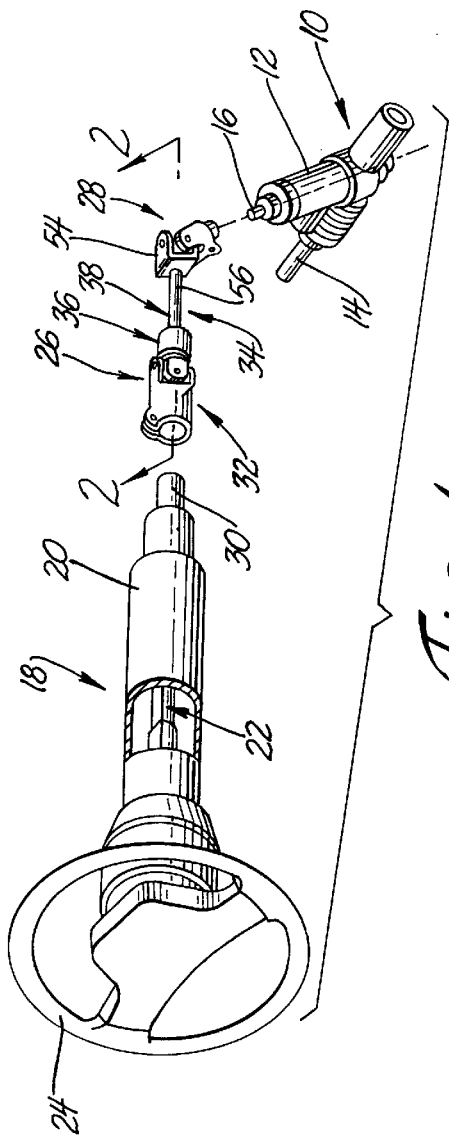
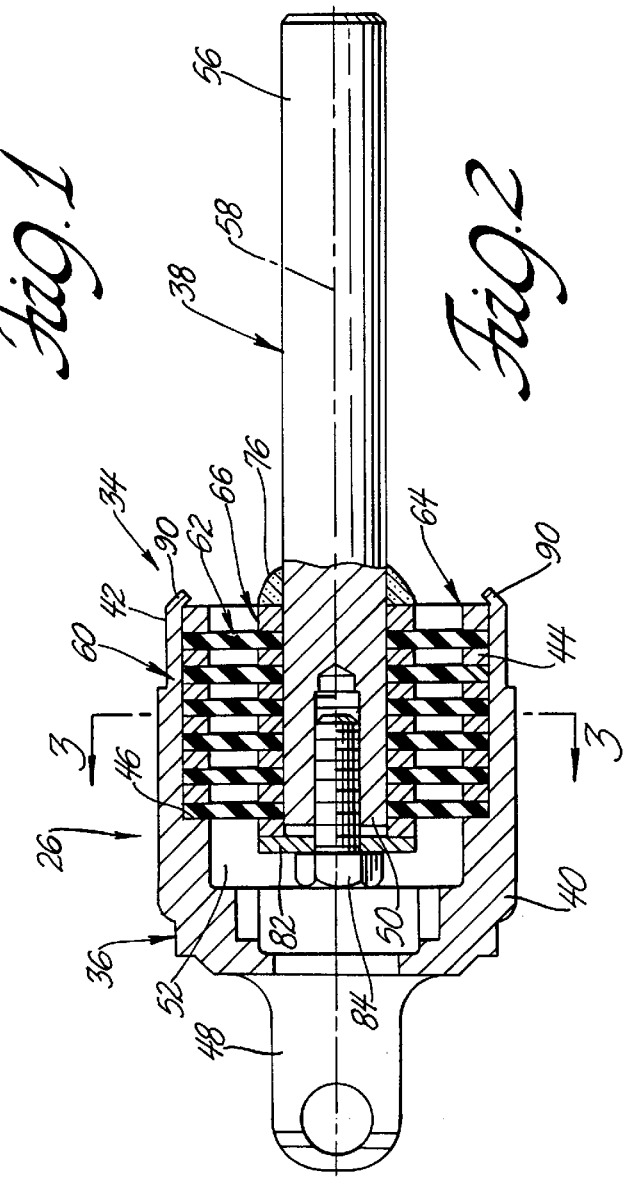
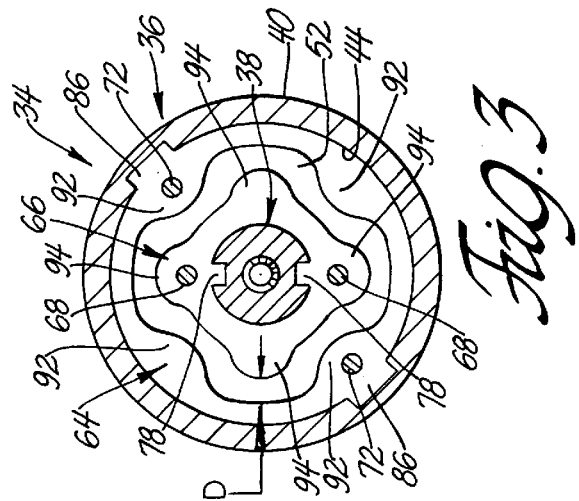

VIBRATION ISOLATOR FOR MOTOR VEHICLE INTERMEDIATE STEERING SHAFT

TECHNICAL FIELD

This invention relates to a linear vibration isolation in a motor vehicle intermediate steering shaft.

BACKGROUND OF THE INVENTION

A motor vehicle typically includes a steering column and a steering gear remote from the steering column. A steering shaft having a steering hand wheel at an outboard end thereof is supported on the steering column for rotation about a longitudinal centerline of the steering column. An intermediate steering shaft is coupled to an inboard end of the steering shaft and to an input shaft of the steering gear. Commonly, the intermediate steering shaft is divided into a pair of separate shaft segments interconnected by a linear vibration isolator consisting of a pair of angularly separated yokes on respective ones of the shaft segments and a single elastomeric isolator disc between the yokes. In order to minimize the transfer of linear vibrations between the shaft segments, the isolator disc should be as axially flexible as possible. In order to transfer steering torque between the shaft segments without perceptible angular looseness, the isolator disc should be as torsionally stiff as possible. However, because the features of the isolator disc which can be varied to increase flexibility usually also concurrently decrease its torsional stiffness and vice versa, it is difficult to optimize the vibration isolation performance of such a single-disc linear vibration isolator without compromising its torsional stiffness performance and vice versa. A linear vibration isolator according to this invention in an intermediate steering shaft is a novel improvement over such single-disc linear vibration isolators.

SUMMARY OF THE INVENTION

This invention is a new and improved linear vibration isolator between a pair of shaft segments of a motor vehicle intermediate steering shaft including an outer member rigidly connected to one of the shaft segments, an inner member rigidly connected to the other of the shaft segments and cooperating with the outer member in defining an annular chamber therebetween, and an axially flexible and torsionally stiff disc pack in the annular chamber. The disc pack includes a plurality of flat outer spacer rings, a plurality of flat inner spacer rings nested inside of respective ones of the outer spacer rings, and a plurality of elastomeric isolator discs stacked between the nested pairs of inner and outer spacer rings. The outer spacer rings with the isolator discs therebetween are clamped against a shoulder on the outer member and coupled to the outer member for unitary rotation therewith. The inner spacer rings with the isolator discs therebetween are clamped against a shoulder on the inner member and coupled to the inner member for unitary rotation therewith. The effective axial flexibility and torsional stiffness of the disc pack is determined by the physical characteristics of and the number of isolator discs and inner and outer spacer rings.

BRIEF DESCRIPTION OF THE DRAWINGS

FIG. 1 is a perspective view of a linear vibration isolator according to this invention in a motor vehicle intermediate steering shaft;

FIG. 2 is an enlarged sectional view taken generally along the plane indicated by lines 2—2 in FIG. 1;

FIG. 3 is a sectional view taken generally along the plane indicated by lines 3—3 in FIG. 2.

DESCRIPTION OF THE PREFERRED EMBODIMENT

Figure 4:
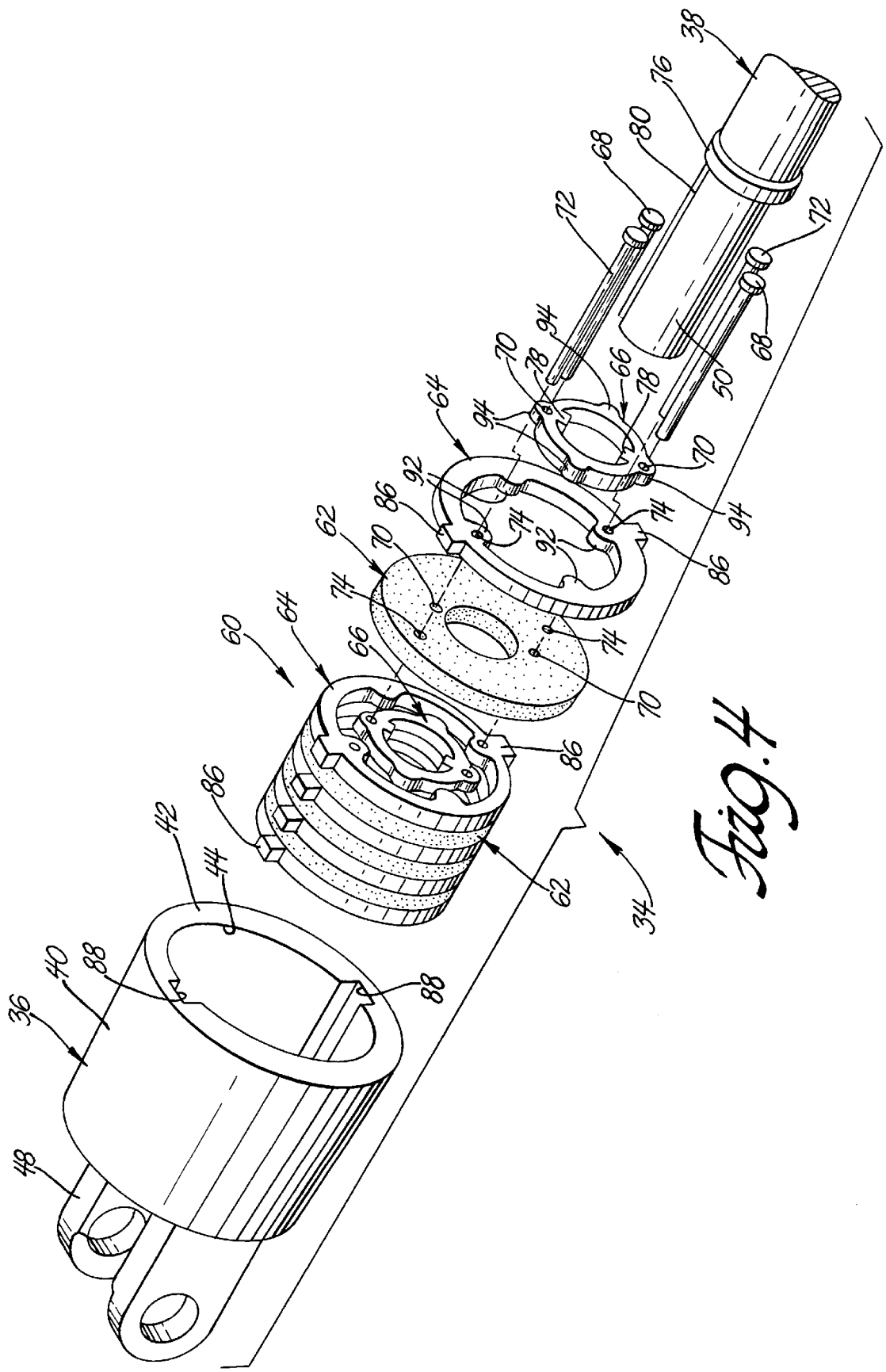
FIG. 4 is a fragmentary exploded perspective view of the linear vibration isolator according to this invention.

Referring to FIG. 1, a schematically represented rack and pinion steering gear 10 is supported on a body, not shown, of a motor vehicle outside of a passenger compartment of the body. The steering gear 10 includes a housing 12, a rack bar 14 supported on the housing for back and forth linear translation, and an input shaft 16 rotatably supported on the housing. Opposite ends, not shown, of the rack bar are linked to steering knuckles of the motor vehicle. Rack and pinion gears, not shown, in the housing 12 convert rotation of the input shaft 16 into linear translation of the rack bar 14 to pivot the steering knuckles and steer the motor vehicle in conventional fashion.

A steering column 18 is supported on the body of the motor vehicle inside of the passenger compartment thereof remote from the steering gear 10 and includes a mast jacket 20, a steering shaft 22 rotatably supported on the mast jacket, and a steering hand wheel 24 rigidly attached to an outboard end of the steering shaft. An intermediate steering shaft 26 is coupled to the steering gear input shaft 16 by a lower universal coupling 28 and to an inboard end 30 of the steering shaft 22 by an upper universal coupling 32. The intermediate steering shaft 26 is interrupted by a linear vibration isolator 34 according to this invention.

As seen best in FIGS. 2–4, the linear vibration isolator 34 includes an outer member 36 constituting a first segment of the intermediate steering shaft and an inner member 38 constituting a second segment of the intermediate steering shaft separate from the first segment. The outer member 36 includes a cup-shaped body 40 having a circular open end 42 and a cylindrical inner wall 44 which terminates at an annular shoulder 46. The outer member 36 is coupled to the steering shaft 22 for unitary rotation therewith by the upper universal coupling 32 which includes a yoke 48 integral with the outer member.

The inner member 38 is a cylindrical shaft having a first end 50 in the cup-shaped body 40 of the outer member and cooperating with the cylindrical inner wall 44 in defining an annular chamber 52 between the inner and outer members. The inner member 38 is coupled to the steering gear input shaft 16 for unitary rotation therewith by the lower universal coupling 28 which includes a yoke 54 rigidly attached to the inner member at a second end 56 thereof. Alternatively, the inner member 38 may be connected to the yoke 54 through a slidable coupling such as described in U.S. Pat. No. 5,348,345, issued Sep. 20, 1994 and assigned to the assignee of this invention, which renders the intermediate steering shaft adjustable in the direction of a longitudinal centerline 58 thereof, FIG. 2, for installation between the steering column 18 and the steering gear 10.

A tubular disc pack 60 of the linear vibration isolator 34 includes a plurality of flat annular isolator discs 62, a plurality of outer spacer rings 64, and a plurality of inner spacer rings 66. Each of the isolator discs 62 is made of an elastomeric material such as urethane rubber and dimensioned to fit freely in the annular chamber 52 between the inner and outer members. Each of the inner and the outer spacer rings 66,64 are likewise dimensioned to fit freely in the annular chamber 52 and, further, to nest in coplanar pairs with a radial separation dimension "D", FIG. 3, therebetween. The isolator discs 62 are stacked between respective nested pairs of inner and outer spacer rings 66,64 to form the disc pack 60. The disc pack is unitized longitudinally and rotationally by a pair of inner rivets 68 extending through respective ones of a plurality of aligned apertures 70 in the inner spacer rings and the isolator discs and by a pair of outer rivets 72 extending through respective ones of a plurality of aligned apertures 74 in the outer spacer rings and the isolator discs.

The disc pack 60 is assembled over the first end 50 of the inner member 38 until the innermost one of the inner spacer rings 66 of the disc pack seats against a shoulder 76, FIGS. 2 and 4, on the inner member. The disc pack is coupled to the inner member for unitary rotation therewith by a pair of diametrically opposite inward projecting radial lugs 78 on each of the inner spacer rings slidably seated in respective ones of a pair of linear channels 80 in the inner member parallel to the longitudinal centerline 58 of the intermediate steering shaft. The disc pack is positively retained on the inner member by a flat washer 82, FIG. 2, captured between the outermost one of the inner spacer rings and a bolt 84 screwed into a screw-threaded bore in the first end 50 of the inner member. The flat washer 82 also tightly clamps all of the inner spacer rings 66 with the isolator discs 62 stacked therebetween against the annular shoulder 76 on the inner member.

The first end 50 of the inner member 38 with the disc pack 60 thereon is inserted into the cup-shaped body 40 of the outer member through the open end 42 thereof and fits freely in the annular chamber 52. Each of the outer spacer rings 64 has a pair of diametrically opposite outward projecting radial lugs 86 thereon slidably received in respective ones of a pair of linear channels 88 in the cylindrical inner wall 44 of the outer member parallel to the longitudinal centerline 58 of the intermediate steering shaft whereby the disc pack is connected to the outer member for unitary rotation therewith. Respective ones of a plurality of integral compression tabs 90, FIG. 2, on the outer member at the open end 42 of the cup-shaped body thereof are plastically deformed behind the outermost one of the outer spacer rings 64 whereby the outer spacer rings with the isolator discs therebetween are clamped against the annular shoulder 46 on the outer member.

In the disc pack 60, the separation between the isolator discs 62 afforded by the nested pairs of inner and outer spacer rings 66,64 on opposite sides thereof allows the isolator discs to flex resiliently in the direction of the longitudinal centerline 58 of the intermediate steering shaft. Conversely, each of the isolator discs is relatively torsionally stiff due to the short radial span between the outer periphery of each of the isolator discs tightly clamped between the shoulder 46 and the tabs 90 on the outer member and the inner periphery of each of the isolator discs tightly clamped between the flat washer 82 and the shoulder 76 on the inner member.

In operation, steering torque applied at the steering hand wheel 24 is transferred to the outer member 36 of the linear vibration isolator 34 through the steering shaft 22 and the upper universal coupling 32 and to the disc pack 60 through the radial lugs 86. Within the disc pack, steering torque is transferred to the isolator discs 62 through the outer peripheries thereof clamped between the outer spacer rings and through the outer rivets 72 and from the isolator discs without perceptible angular looseness to the inner spacer rings 66 through the inner peripheries of the isolator discs clamped between the inner spacer rings and through the inner rivets 68. Steering torque is then transferred from the disc pack 60 through the radial lugs 78 to the inner member 38 and to the steering gear input shaft 16 through the lower universal coupling 28. At the same time, the transfer of linear vibrations between the steering gear input shaft and the steering shaft is interrupted by resilient axial flexure of each of the isolator discs 62 in the disc pack in the direction of the centerline 58.

Importantly, the effective axial resilience and torsional stiffness of the disc pack 60 is determined by the physical characteristics of the individual isolator discs 62, by the structural dimensions of the isolator discs and the inner and outer spacer rings 66,64, and by the number of isolator discs and inner and outer spacer rings in the disc pack. With such a relatively large number of features to vary to adjust the effective axial resilience and torsional stiffness of the disc pack, it is possible for engineers to more easily adjust the performance of the linear vibration isolator 34 for different motor vehicle applications than it is to effect similar adjustments of prior linear vibration isolators characterized by only a single isolator disc. The linear vibration isolator 34 according to this invention is, therefore, an improvement over such prior single-disc linear vibration isolators.

As best seen in FIGS. 3–4, each of the outer spacer rings 64 further includes diametrically opposite pairs of inward projecting lobes 92. Each of the inner spacer rings 66 further includes diametrically opposite pairs of outward projecting lobes 94 between and radially overlapping the inward projecting lobes 92 on the outer spacer rings. If the isolator discs 62 become torsionally overloaded, the lobes 92,94 cooperate with each other and with the radial lugs 78,86 in defining a positive couple between the inner and the outer members 38,36 after a predetermined angular interval of relative rotation therebetween to sustain the transfer of steering torque between the steering hand wheel 24 and the steering gear input shaft 16.

Having thus described the invention, what is claimed is:

1. A linear vibration isolator comprising:

an outer member rotatable about a longitudinal centerline of the linear vibration isolator having a cylindrical inner wall, an inner member rotatable about the longitudinal centerline of the linear vibration isolator having an outer cylindrical wall facing the inner cylindrical wall of the outer member and cooperating therewith in defining an annular chamber between the inner member and the outer member, a tubular disc pack in the annular chamber consisting of a plurality of axially flexible and torsionally stiff isolator discs stacked between a plurality of flat outer spacer rings and a plurality of flat inner spacer rings nested inside of respective ones of the outer spacer rings, a first drive means operative to couple each of the outer spacer rings of the tubular disc pack to the outer member for rotation as a unit therewith, a second drive means operative to couple each of the tubular inner spacer rings of the tubular disc pack to the inner member for rotation as a unit therewith, a first clamping means operative to clamp the disc pack against a shoulder on the outer member with each of the isolator discs at an outer periphery thereof clamped between the outer spacer rings on opposite sides thereof so that each of the isolator discs is rigidly attached to the outer member, and a second clamping means operative to clamp the disc pack against a shoulder on the inner member with each of the isolator discs at an inner periphery thereof clamped between the inner spacer rings on opposite sides thereof so that each of the isolator discs is rigidly attached to the inner member, each of the isolator discs being torsionally stiff to transfer torque between the inner and the outer members about the longitudinal centerline of the linear vibration isolator and axially resiliently flexible in the direction of the longitudinal centerline of the linear vibration isolator to interrupt the transfer of linear vibrations between the inner and the outer members.

2. The linear vibration isolator recited in claim 1 wherein the first drive means comprises:

a plurality of diametrically opposite outward projecting radial lugs on each of the outer spacer rings, and a corresponding plurality of diametrically opposite pairs of linear channels in the cylindrical inner wall of the outer member parallel to the longitudinal centerline of the linear vibration isolator slidably receiving respective ones of the outward projecting radial lugs on the outer spacer rings.

3. The linear vibration isolator recited in claim 2 wherein the second drive means comprises:

a plurality of diametrically opposite inward projecting radial lugs on each of the inner spacer rings, and a corresponding plurality of diametrically opposite pairs of linear channels in the cylindrical wall of the inner member parallel to the longitudinal centerline of the linear vibration isolator slidably receiving respective ones of the inward projecting radial lugs on the inner spacer rings.

4. The linear vibration isolator recited in claim 3 wherein the first clamping means comprises:

a plurality of integral tabs on the outer member at an open end of the cylindrical inner wall thereof plastically deformed behind an outermost one of the outer spacer rings.

5. The linear vibration isolator recited in claim 4 wherein the second clamping means comprises:

a flat washer means, and a fastener means on the inner member operative to clamp the flat washer means against an innermost one of the inner spacer rings.

6. The linear vibration isolator recited in claim 1 further comprising:

a lost-motion connection means on each of the outer spacer rings and on each of the inner spacer rings operative to effect a positive driving couple therebetween after a predetermined angular interval of relative rotation between the inner member and the outer member.

7. The linear vibration isolator recited in claim 6 wherein the lost-motion connection means comprises:

a pair of diametrically opposite outward projecting radial lobes on each of the inner spacer rings, and a pair of diametrically opposite inward projecting radial lobes on each of the outer spacer rings angularly separated from and radially overlapping the outward projecting radial lobes on the respective ones of the inner spacer rings nested therein.

8. A motor vehicle intermediate steering shaft comprising:

a first element coupled to a steering shaft of the motor vehicle for unitary rotation with the steering shaft, a second element coupled to an input shaft of a steering gear of the motor vehicle for rotation as a unit with the steering gear input shaft, an outer member rigidly connected to the first element and rotatable about a longitudinal centerline of the linear vibration isolator having a cylindrical inner wall, an inner member rigidly connected to the second element and rotatable about the longitudinal centerline of the linear vibration isolator having an outer cylindrical wall facing the inner cylindrical wall of the outer member and cooperating therewith in defining an annular chamber between the inner member and the outer member, a tubular disc pack in the annular chamber consisting of a plurality of axially flexible and torsionally stiff isolator discs stacked between a plurality of flat outer spacer rings and a plurality of flat inner spacer rings nested inside of respective ones of the outer spacer rings, a first drive means operative to couple each of the outer spacer rings of the tubular disc pack to the outer member for rotation as a unit therewith, a second drive means operative to couple each of the tubular inner spacer rings of the tubular disc pack to the inner member for rotation as a unit therewith, a first clamping means operative to clamp the disc pack against a shoulder on the outer member with each of the isolator discs at an outer periphery thereof clamped between the outer spacer rings on opposite sides thereof so that each of the isolator discs is rigidly attached to the outer member, and a second clamping means operative to clamp the disc pack against a shoulder on the inner member with each of the isolator discs at an inner periphery thereof clamped between the inner spacer rings on opposite sides thereof so that each of the isolator discs is rigidly attached to the inner member, each of the isolator discs being torsionally stiff to transfer torque between the inner and the outer members about the longitudinal centerline of the linear vibration isolator and axially resiliently flexible in the direction of the longitudinal centerline of the linear vibration isolator to interrupt the transfer of linear vibrations between the inner and the outer members.

\* \* \* \* \*